(12) United States Patent
Hirabayashi

(10) Patent No.: US 9,904,232 B2
(45) Date of Patent: Feb. 27, 2018

(54) POWER SUPPLY APPARATUS AND IMAGE FORMING APPARATUS

(71) Applicant: CANON KABUSHIKI KAISHA, Tokyo (JP)

(72) Inventor: Jun Hirabayashi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/040,273

(22) Filed: Feb. 10, 2016

(65) Prior Publication Data
US 2016/0238983 A1 Aug. 18, 2016

(30) Foreign Application Priority Data

Feb. 18, 2015 (JP) .................. 2015-029697
Dec. 28, 2015 (JP) .................. 2015-257069

(51) Int. Cl.
*H02M 3/335* (2006.01)
*H02M 7/02* (2006.01)
*G03G 15/00* (2006.01)
*H02M 3/337* (2006.01)

(52) U.S. Cl.
CPC ........ *G03G 15/80* (2013.01); *H02M 3/33546* (2013.01); *H02M 3/337* (2013.01)

(58) Field of Classification Search
CPC ................ H02M 3/33546; H02M 3/33561
USPC ........... 363/21.04, 21.05, 21.09, 21.1, 21.12, 363/21.13, 21.17, 21.18, 63
See application file for complete search history.

(56) References Cited

U.S. PATENT DOCUMENTS

| 5,285,368 | A | * | 2/1994 | Ishikawa | G03G 15/0283 363/21.05 |
| 5,532,913 | A | | 7/1996 | Suzuki et al. | |
| 6,111,763 | A | * | 8/2000 | Hanabusa | H02M 3/33523 363/21.15 |
| 6,232,964 | B1 | * | 5/2001 | Lee | G09G 1/16 345/211 |
| 6,346,800 | B1 | * | 2/2002 | Mano | G03G 15/20 323/225 |
| 6,487,093 | B1 | * | 11/2002 | Vogman | H02M 3/33561 363/21.02 |

(Continued)

FOREIGN PATENT DOCUMENTS

| JP | H05-300740 A | 11/1993 |
| JP | 2007-206414 A | 8/2007 |

*Primary Examiner* — Gary Nash
(74) *Attorney, Agent, or Firm* — Fitzpatrick, Cella, Harper & Scinto

(57) ABSTRACT

The power supply apparatus includes a transformer, a switch connected to a primary side of the transformer, a first line connected to a secondary side of the transformer to output a voltage of a first polarity, a second line connected to the secondary side of the transformer to output a second polarity voltage whose polarity is opposite to the first polarity, a first diode connected to the first line in a direction, a first capacitor connected to the first line, a second diode connected to the second line in another direction opposite to the direction of the first diode, a second capacitor connected to the second line, a resistor connected to the first line on an output side of the first diode, and a controller controlling a frequency of the switch to control an output from the second line constant.

12 Claims, 5 Drawing Sheets

(56) References Cited

U.S. PATENT DOCUMENTS

| | | | | |
|---|---|---|---|---|
| 2003/0222631 A1* | 12/2003 | Voto | .................... | H02M 7/5381 |
| | | | | 323/266 |
| 2004/0032754 A1* | 2/2004 | Yang | ....................... | H02M 1/32 |
| | | | | 363/56.09 |
| 2010/0209132 A1* | 8/2010 | Takami | .............. | G03G 15/5004 |
| | | | | 399/88 |
| 2011/0150523 A1* | 6/2011 | Kawakatsu | ............ | G03G 15/80 |
| | | | | 399/88 |
| 2012/0092895 A1* | 4/2012 | Muehlhoefer | .... | H02M 3/33561 |
| | | | | 363/16 |
| 2012/0236481 A1* | 9/2012 | Hanington | ............ | H02M 7/106 |
| | | | | 361/679.01 |
| 2012/0262081 A1* | 10/2012 | Zhang | ................ | H05B 33/0815 |
| | | | | 315/223 |
| 2013/0301319 A1* | 11/2013 | Ide | ......................... | H02M 1/44 |
| | | | | 363/52 |
| 2013/0313905 A1* | 11/2013 | Hart | .................. | H02M 3/33561 |
| | | | | 307/31 |
| 2014/0043869 A1* | 2/2014 | Hirabayashi | ...... | H02M 3/33507 |
| | | | | 363/21.16 |
| 2014/0301117 A1 | 10/2014 | Hirabayashi | | |

* cited by examiner

POWER SUPPLY APPARATUS AND IMAGE FORMING APPARATUS

BACKGROUND OF THE INVENTION

Field of the Invention

The present invention relates to a power supply apparatus and an image forming apparatus, and more particularly, to a secondary-side rectification circuit of a switching power supply using a transformer.

Description of the Related Art

Hitherto, electrophotographic image forming apparatus, which use electrophotography to copy an image onto recording paper, have been widely used. An image forming apparatus of this type emits light of a laser or the like onto a photosensitive drum charged uniformly to a high positive or negative electric potential, in a pattern based on image data, to form a latent image with electrostatic charges on the photosensitive drum. A developer such as a toner is filed onto the latent image on the photosensitive drum by electrostatic force to develop the latent image on the photosensitive film. A sheet of recording paper is then laid on the developer after the developing, and electric charges having a polarity opposite to that of the developer are applied from the rear surface of the recording paper. The developer is consequently adsorbed to the front surface of the recording paper by electrostatic force to be transferred to the recording paper. The transferred developer is then fixed onto the recording paper by heating and pressing the recording paper. Electrophotography thus utilizes electrostatic force to move a developer in the respective processes and accordingly requires a power supply configured to generate voltages of varying high levels and varying polarities.

Details of an image forming apparatus are described in Japanese Patent Application Laid-Open No. 2007-206414, for example. This image forming apparatus includes a positive power supply configured to output a positive voltage as a transfer voltage for transferring a negatively charged developer onto recording paper. The image forming apparatus of Japanese Patent Application Laid-Open No. 2007-206414 also includes a negative power supply configured to generate a charging voltage for charging a photosensitive drum, a developing voltage for causing the developer to fly onto the photosensitive drum, and a negative transfer voltage for cleaning a transfer roller. These voltages are high voltages of several hundred V to several thousand V, and a booster circuit using a transformer or the like is needed to generate the high voltages. Accordingly, generating four voltages, i.e., the positive transfer voltage, the negative transfer voltage, the charging voltage, and the developing voltage, normally requires four transformers. In Japanese Patent Application Laid-Open No. 2007-206414, for example, the positive transfer voltage and the negative transfer voltage for the transfer roller, which needs a positive voltage and a negative voltage both, are generated respectively by a dedicated transformer and a shared transformer configured to generate the charging voltage. Three transformers in total thus form a booster circuit, thereby keeping the cost down.

A way to make the number of transformers less than the number of output types as in this example is multiple output transformers, which are a common technology in switching power supplies. A multiple output transformer is a transformer in which one primary winding and a plurality of secondary windings having different numbers of turns are wound around a single core, and is capable of generating a different voltage from each secondary winding. Through connection of a rectification element to one of the secondary windings of the multiple output transformer in one direction and connection of another rectification element to another of the secondary windings in the opposite direction, voltages of different polarities can be generated with a single transformer, which helps to generate many voltages of different polarities and different voltages with a number of transformers that are fewer than the number of voltage types.

However, to output a high voltage, in particular, the multiple output transformer needs to be high in the ratio of the number of turns of the primary winding and the number of turns of each secondary winding. This makes the total number of turns of the plurality of secondary windings high and the size of the transformer accordingly large. In addition, setting the ratio of the numbers of turns based on output voltages makes the multiple output transformer a dedicated transformer that cannot be adapted to changes in output specifications and is low in versatility. Further, fluctuations in the output current of one secondary winding affect the output voltage of another secondary wiring, thereby dropping precision and making it difficult to control. The positive transfer voltage, the negative transfer voltage, the charging voltage, and the developing voltage in the example of the related art also need to be changed and turned on/off independently from one another. It is therefore impractical to use a multiple output transformer that cannot be controlled flexibly as a power supply of a type of image forming apparatus that is described in the example of the related art. Although successful in reducing the number of transformers by integrating some of transformers configured to generate the different voltages, the example of the related art still needs a positive voltage generating transformer to generate a positive voltage and a negative voltage generating transformer to generate a negative voltage. In the case where one pair of a positive voltage and a negative voltage is necessary, for example, at least two transformers are therefore needed in the example of the related art.

SUMMARY OF THE INVENTION

An object of the present invention is to generate voltages of different polarities with a single transformer without lowering versatility.

In order to solve the above-mentioned problems, an object of the present invention is to provide a power supply apparatus, including a transformer, a switching element connected to a primary side of the transformer, a first line connected to a secondary side of the transformer, the first line configured to output a voltage of a first polarity, a second line connected to the secondary side of the transformer, the second line configured to output a second polarity voltage whose polarity is opposite to the first polarity, a first diode connected to the first line in a predetermined direction, a first capacitor connected to the first line between a voltage output side of the first diode and a ground, a second diode connected to the second line in a direction opposite to the predetermined direction of the first diode, a second capacitor connected to the second line between a voltage output side of the second diode and the ground, a resistor element connected to the first line on an output side of the first diode; and a control unit configured to control a drive frequency of the switching element to control a voltage output from the second line constant.

Another object of the present invention is to provide an image forming apparatus, including an image forming unit configured to form an image; and a power supply configured to supply a voltage to the image forming unit, the power supply including a transformer, a switching element connected to a primary side of the transformer, a first line connected to a secondary side of the transformer, the first line configured to output a voltage of a first polarity, a second line connected to the secondary side of the transformer, the second line configured to output a second polarity voltage whose polarity is opposite to the first polarity, a first diode connected to the first line in a predetermined direction, a first capacitor connected to the first line between a voltage output side of the first diode and a ground, a second diode connected to the second line in a direction opposite to the predetermined direction of the first diode, a second capacitor connected to the second line between a voltage output side of the second diode and the ground, a resistor element connected to the first line on an output side of the first diode; and a control unit configured to control a drive frequency of the switching element to control a voltage output from the second line constant.

Further features of the present invention will become apparent from the following description of exemplary embodiments with reference to the attached drawings.

DESCRIPTION OF THE EMBODIMENTS

Embodiments for implementing the present invention are described in detail below through embodiments with reference to the accompanying drawings. A power supply apparatus described below is, for example, a power supply configured to generate various levels of high voltage necessary in an electrophotographic image forming apparatus. Examples of the image forming apparatus here include copying machines, laser printers, LED printers, and electrophotographic fax machines.

(First Embodiment)

[Power Supply Apparatus]

Figure 1:
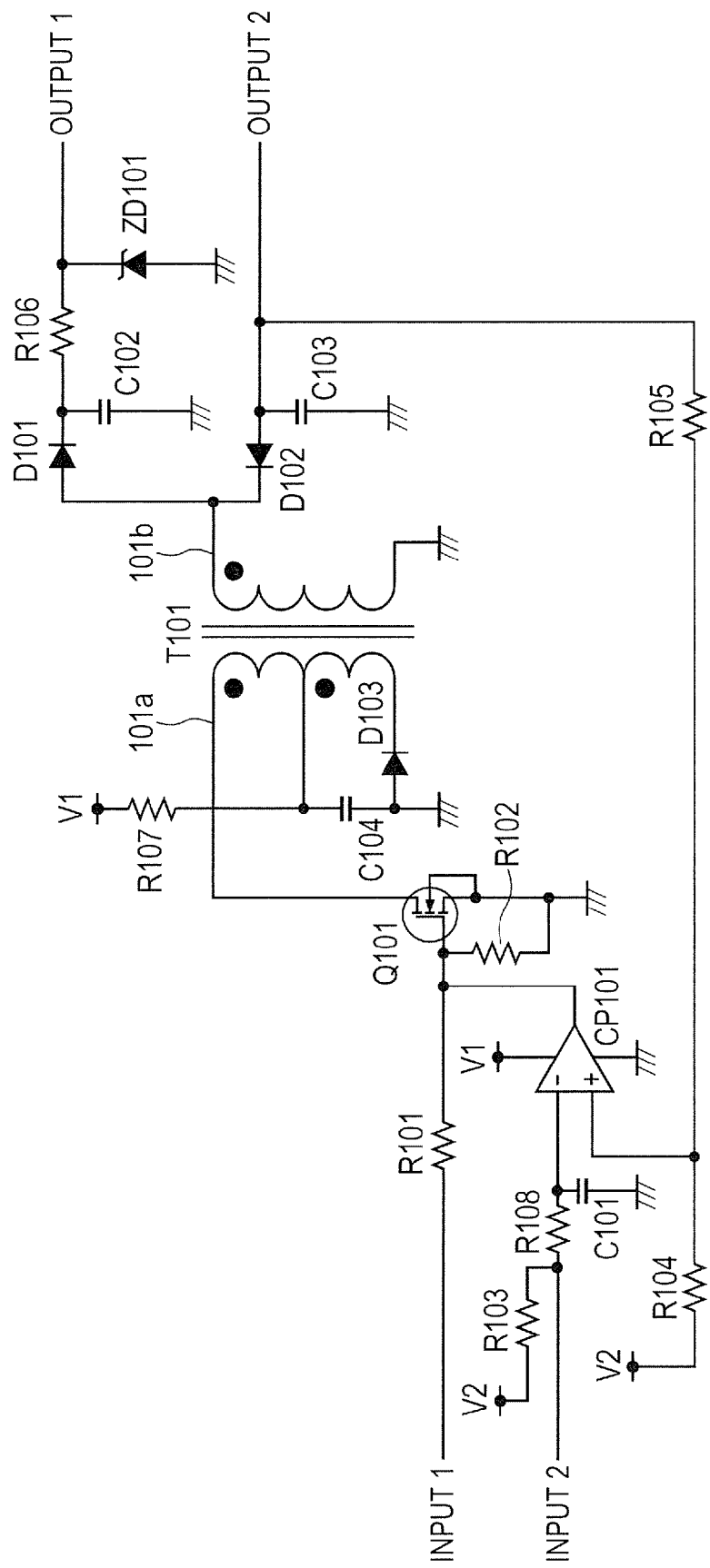
FIG. 1 is a circuit diagram of a power supply apparatus according to a first embodiment of the present invention.

FIG. 1 is a circuit diagram of a power supply apparatus according to a first embodiment of the present invention. The power supply apparatus of FIG. 1 is a switching power supply, for example, a circuit configured to output a positive voltage of +300 V from an output 1 and a negative voltage of −750 V from the output 2. The circuit of this embodiment supplies voltages and currents of different polarities from a single transformer to a load that needs a positive voltage and a load that needs a negative voltage out of a plurality of voltages used in an image forming apparatus. In particular, a feature of the circuit of this embodiment resides in that the circuit is configured so that fluctuations of one load hardly affect voltage generation for the other load.

A direct current power supply configured to generate a voltage V1 to supply large power is connected to the primary side of the power supply apparatus. The voltage V1 is for generating a primary current that flows in a primary winding 101a of a transformer T101, and is 24 V, for example. A direct current power supply that is high in precision and configured to supply a voltage V2 to a control circuit is also connected to the primary side of the power supply apparatus. The voltage V2 is, for example, 3.3 V or 5 V.

The transformer T101 includes the primary winding 101a and a secondary winding 101b. The ratio of the number of turns of the primary winding 101a and the number of turns of the secondary winding 101b is set to, for example, 84:2,700 for voltage boosting. A switching element Q101 for switching operation is connected to one end of the primary winding 101a of the transformer T101. A MOSFET is used for the switching element Q101. An input 1 is connected to a gate terminal of the switching element Q101, and a signal is input to the input 1 from a control unit of a machine in which the power supply apparatus is mounted. The signal input to the input 1 controls the on/off operation of the switching element Q101, namely, switching operation (oscillation operation). A resistor R102 is connected between the gate terminal and source terminal of the switching element Q101.

A cathode terminal of a diode D103 is connected to the other end of the primary winding 101a of the transformer T101. An anode terminal of the diode D103 is connected to a ground (hereinafter abbreviated as GND). The primary winding 101a of the transformer T101 has an intermediate tap, and a capacitor C104 is connected between the tapped point of the primary winding 101a and the anode terminal of the diode D103. The voltage V1 is supplied to the tapped point of the transformer T101 via a resistor R107. A current flows in the primary winding 101a of the transformer 1101 in the order V1→R107→T101→Q101 when the switching element Q101 is switched on, and in the order T101→C104→D103 when the switching element Q101 is switched off. The current that flows when the switching element Q101 is switched off is a regenerative current. While the primary winding 101a of the transformer T101 is tapped in this embodiment, the present invention is not limited to this configuration.

An anode terminal of a diode D101 and a cathode terminal of a diode D102 are connected to one end of the secondary winding 101b of the transformer T101. In other words, the diode D101 and the diode D102, which differ from each other in terms of how the diode polarity is connected, are both connected to one end of the secondary winding 101b of the transformer T101. The diode D101 is a first rectification element, which is connected to the secondary winding 101b of the transformer T101 in a predetermined direction to output a positive voltage as a voltage having a first polarity. The diode D102 is a second rectification element, which is connected to the secondary winding 101b of the transformer T101 in a direction opposite to the predetermined direction, in parallel to the diode D101, to output a negative voltage as a voltage having a second polarity. The second polarity is opposite to the first polarity.

One end of a capacitor C102 is connected to a cathode terminal of the diode D101. The other end of the capacitor C102 is connected to the GND. A cathode terminal of a Zener diode ZD101 is also connected to the cathode terminal of the diode D101 via a resistor R106 to be supplied as the output 1 of the power supply apparatus to a load. An anode terminal of the Zener diode ZD101 is connected to the GND. One end of a capacitor C103 is connected to an anode terminal of the diode D102 to be supplied as the output 2 of the power supply apparatus to a load. The other end of the capacitor C103 is connected to the GND. The other end of the secondary winding 101b of the transformer T101 is connected to the GND.

The secondary-side operation of the transformer T101 is described. When the switching element Q101 is switched on, the diode D101 is turned on and the diode D102 is turned off. A current flows on the secondary side of the transformer T101 in the order T101→D101→C102. The capacitor C102 is charged with a voltage that is positive with respect to the GND. When the switching element Q101 is switched off, on the other hand, the diode D101 is turned off and the diode D102 is turned on. A current flows on the secondary side of the transformer T101 in the order GND→C103→D102→T101. The capacitor C103 is charged with a voltage that is negative with respect to the GND. This is because, with the diode D101 and the diode D102 connected in opposite directions (opposite polarities), electrical connection of the diode d101 is established in the forward operation of the transformer T101 and electrical connection of the diode D102 is established in the flyback operation of the transformer T101.

The voltage (positive) with which the capacitor C102 is charged flows into the GND via the resistor R106 and the Zener diode ZD101. The Zener diode ZD101 has a Zener voltage of 300 V. The output 1 accordingly remains 300 V, which is a predetermined voltage, despite load fluctuations as long as the following condition is met:

(Voltage of $C102$−(resistance value of $R106$×current flowing in $R106$))>300

The Zener diode ZD101 is thus a constant voltage element that is connected to the output side of the diode D101 to keep the voltage of at a predetermined voltage that is determined by the Zener voltage.

(Feedback Control of Output 2)

Feedback control is performed on the output 2. A comparator CP101 is a comparison unit configured to compare a voltage determined by the output voltage of the output 2 with a reference voltage. The switching element Q101 is controlled based on the result of a comparison made by the comparator CP101.

The output 2 is connected to one end of a resistor R105, and the other end of the resistor R105 is connected to one end of a resistor R104. The other end of the resistor R104 is connected to the power supply configured to supply the voltage V2. A connection point where the resistor R104 and the resistor R105 are connected is connected to a non-inverting input terminal of the comparator CP101. In other words, a voltage generated by dividing a difference between the voltage V2 and the voltage of the output 2 by the resistor R104 and the resistor R105 is input to the non-inverting input terminal of the comparator CP101. One end of a resistor R103 is connected to the power supply configured to supply the voltage V2, and the other end of the resistor R103 is connected to one end of a resistor R108. The other end of the resistor R108 is connected to an inverting input terminal of the comparator CP101. The other end of the resistor R108 is also connected to one end of a capacitor C101. The other end of the capacitor C101 is connected to the GND. The resistor R108 and the capacitor C101 form an integration circuit. A signal from an input 2 is input to the inverting input terminal of the comparator CP 101. An output terminal of the comparator CP101 is connected to the gate terminal of the switching element Q101.

The mechanism of feedback control of the output 2 is described below. A clock pulse for driving the switching element Q101 is input from the input 1 via a resistor R101.

The signal input to the input 1 is, for example, a signal that has a frequency of 16.6 kHz, an on-duty ratio of 10%, and a peak-to-peak voltage of 3.3 vpp, and that is input from an oscillation circuit (not shown) or a control unit (not shown) such as a CPU. The oscillation circuit or the control unit may be included in the power supply apparatus, or may be included in the machine in which the power supply apparatus is mounted. An example of the machine in which the power supply apparatus is mounted is an image forming apparatus.

A pulse width modulation (PWM) signal for determining the output voltage of the output 2 is input to the input 2. General-purpose ports for a transistor, a CPU having an open drain structure, and the like are connected to a portion of the input 2 that is not shown, and a PMW signal having two values, high impedance (High-Z) and a low level (Low), is input to the input 2. For example, the power supply apparatus is configured so that the output voltage of the output 2 is −1,500 V when the off-duty ratio (a high impedance state) of the PWM signal input to the input 2 is 100%. With this configuration, the voltage of the output 2 is −750 V when the off-duty ratio of the PWM signal input to the input 2 is 50%. The CPU or the like that is connected to the input 2 functions as a unit configured to change a voltage input to the inverting input terminal of the comparator CP101.

[Operation of the Power Supply Apparatus]

Specific operation of the power supply apparatus is described. When a PWM signal is input from the input 2, a voltage equal to or less than the voltage V2 that is determined by the duty ratio of the PWM signal is input to the inverting input terminal of the comparator CP101. A voltage generated by dividing a difference between the voltage V2 and the voltage of an output 2 by the resistor R104 and the resistor R105 is input to the non-inverting input terminal of the comparator CP101. The comparator CP101 compares the voltage input to the inverting input terminal and the voltage input to the non-inverting input terminal. The voltage input to the inverting input terminal of the comparator CP101 here is a voltage that has an objective value for the output voltage of the output 2 (hereinafter referred to as target voltage), and serves as a reference voltage. The target voltage can be changed by changing the duty ratio of the PWM signal that is input from the input 2 as described above.

The voltage input to the non-inverting input terminal of the comparator CP101 is a feedback voltage of the output 2. The comparator CP101 outputs a low-level signal when the target voltage input to the inverting input terminal is higher than the feedback voltage input to the non-inverting input terminal, and pulls in a signal of the input 1 that is input to the gate terminal of the switching element Q101. No voltage is accordingly applied to the gate terminal of the switching element Q101 while the signal output from the comparator CP101 remains a low-level signal. This stops the oscillation operation of the switching element Q101 which is controlled by a signal (clock pulse) input to the gate terminal of the switching element Q101 from the input 1.

An example using specific numerical values is predetermined. A pulse signal having a frequency of 16.6 kHz and a high duty ratio of 10% is selected as a signal input to the input 1. A PMW signal having a frequency of 32 kHz and an off-duty ratio of 50% is selected as a signal input to the input 2. The voltage V2 is set to 5.4 V, and constant numbers are set so that the ratio of the resistor R104 and the resistor R105 is 4:1,119. The voltage input to the inverting input terminal of the comparator CP101 in this case is calculated as follows:

5.4×0.5=2.7 (V)

When the voltage of the output 2 is 0 V, the voltage input to the non-inverting input terminal of the comparator CP101 is calculated as follows:

5.4−((5.4−0)×(4/1, 123))=5.38 (V)

The voltages input to the input terminals of the comparator CP101 in this case have the following relation: Non-inverting input terminal (5.38 V)>inverting input terminal (2.7 V)

This makes the output of the comparator CP101 high impedance, and the signal of the input 1 drives the switching element Q101 instead of being masked by the output of the comparator CP101. Driving the switching element Q101 lowers the voltage of the output 2 relative to the GND.

When the voltage of the output 2 reaches −750 V, the voltage input to the non-inverting input terminal of the comparator CP101 is calculated as follows:

5.4−((5.4−(−750))×(4/1, 123))=2.7 (V)

As the switching element Q101 continues to oscillate, the voltage of the output 2 keeps dropping and the relation of the voltages input to the input terminals of the comparator CP101 changes to:

Non-inverting input terminal<inverting input terminal

The comparator CP101 therefore outputs a low-level signal. When the output of the comparator CP101 is at the low level, the pulse signal input from the input 1 is pulled to the output terminal side of the comparator CP101 and cannot be used for the driving of the switching element Q101. In this manner, the output 2 on the secondary side of the transformer T101 is determined by the duty ratio of the PWM signal input from the input 2. In addition, the comparator CP101 exerts appropriate control so that the voltage of the output 2 does not change despite fluctuations of a load connected to the output 2.

As described above, according to this embodiment, voltages of different polarities can be generated with a single transformer while allowing substantially no drop in versatility. In particular, a general transformer instead of a special product such as a multiple output transformer can be used as the single transformer. Further, the power supply apparatus provides positive power and negative power that hardly interfere with each other, and can accordingly be used as a stable and high-precision power source.

(Second Embodiment)

[Power Supply Apparatus]

Figure 2:
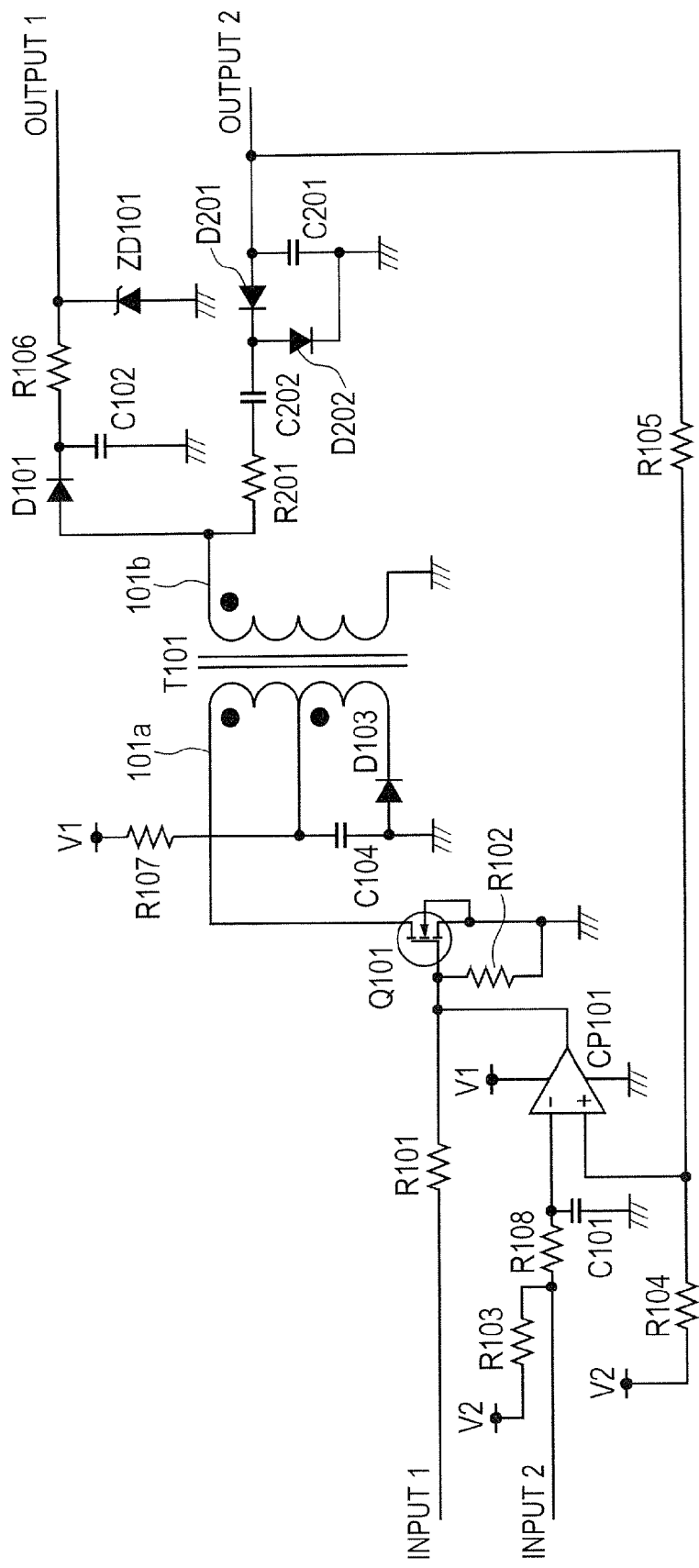
FIG. 2 is a circuit diagram of a power supply apparatus according to a second embodiment of the present invention.

FIG. 2 is a circuit diagram for illustrating the configuration of a power supply apparatus according to a second embodiment of the present invention. Components that are the same as those in the first embodiment described with reference to FIG. 1 are denoted by the same reference symbols that are used in the first embodiment, and descriptions thereof are omitted here. This embodiment differs from the first embodiment in the configuration of the output 2 on the secondary side of the power supply apparatus. In this embodiment, one end of a resistor R201 is connected to the secondary winding 101b of the transformer T101, and the other end of the resistor R201 is connected to one end of a capacitor C202. The other end of the capacitor C202 is connected to a cathode terminal of a diode D201. The other end of the capacitor C202 is also connected to an anode terminal of a diode D202. An anode terminal of the diode D201 is connected to one end of a capacitor C201. A cathode terminal of the diode D202 is connected to the other end of the capacitor C201, and a connection point where the two are connected is connected to the GND.

In the first embodiment, a flyback voltage generated on the secondary side of the transformer T101 is rectified and then used without further modification as the output 2. In this embodiment, the diode D201, which is a second rectification element, the diode D202, the capacitor C201, and the capacitor C202 form a voltage doubler rectification circuit as the output 2. The voltage doubler rectification circuit configured to rectify a voltage induced by the secondary winding 101b of the transformer T101 to a double voltage is a common technology, and a description thereof is omitted. In this embodiment, where the voltage doubler rectification circuit is included, a voltage generated as the output 2 is higher than the one in the power supply apparatus of the first embodiment. An example using specific numerical values is predetermined. The voltage of the output 2 in the first embodiment is −1,500 V when the PWM signal of the input 2 has a duty ratio of 100%. In this embodiment, on the other hand, the voltage of the output 2 that is generated when the PWM signal of the input 2 has a duty ratio of 100% is even lower in electric potential than −1,500 V.

The first embodiment is configured so that load fluctuations of the output 1 and load fluctuations of the output 2 hardly affect each other. However, there is a limit to the range of load fluctuations. Specifically, a light load at the output 2 may deteriorate the current supplying ability of the output 1 and lower the voltage of the output 1. This is because the output 1 and the output 2 share voltage of the output 1 and a cycle in which the transformer T101 is excited, namely, the drive frequency of the switching element Q101, is associated with the feedback of the output 2. Consequently, a light load at the output 2 lowers the excitation frequency of the transformer T101 and decreases current supply to the output 1, which utilizes the forward output of the transformer T101, as well. This embodiment enables the power supply apparatus to deal with these issues resulting from a light load of the output 2 by providing the resistor R201 between the secondary winding 101b of the transformer T101 and the voltage doubler rectification circuit.

(Function of the Resistor R201)

Connecting the resistor R201 to the secondary winding 101b of the transformer T101 drops voltage and makes it difficult to increase the charging voltage of the capacitor C201 which is determined by the flyback voltage of the transformer T101. The resistor R201 therefore functions as a voltage dropping unit. For example, the charging voltage of the capacitor C201 is predetermined as B when the resistance value of the resistor R201 is 0Ω, that is, when the resistor R201 is not connected, and the excitation frequency of the transformer T101 is predetermined as A. The charging voltage of the capacitor C201 is predetermined as C when the resistance value of the resistor R201 is 100 kΩ and the excitation frequency of the transformer T101 is the same at A. In this case, the charging voltage C of the capacitor C201 is lower than the charging voltage B, which means that, to output a predetermined voltage to the output 2, the excitation frequency of the transformer T101 needs to be higher when the resistor R201 is connected than when the resistor R201 is not connected. It is concluded from the above that, by connecting the resistor R201 to the secondary side of the transformer T101, the transformer T101 is driven at a high excitation frequency even when the load of the output 2 is light. The ability to supply current to the load of the output 1 can thus be kept high.

The resistor R201 is set to a value that does not cause a drop in the voltage of the output 1 when a load connected to the output 2 is at the lightest possible level that can be expected for the output 2 and the load of the output 1 is at the heaviest possible level that can be expected for the output 1. The maximum output performance of the output 2 is deteriorated by connecting the resistor R201. It is therefore necessary to check whether a predetermined voltage can be supplied to the heaviest possible load that can be expected for the output 2 at a constant number set to the resistance value of the resistor R201.

The issues resulting from a light load of the output 2 can also be solved with a configuration in which a resistor or the like is connected as a dummy load between the output 2 and the GND by utilizing the principle described above. The resistor R101 is connected to the illustrated point in this embodiment because this embodiment employs a voltage doubler rectification circuit and is accordingly capable of generating an output voltage higher than in the first embodiment. For that reason, the resistor R201 is connected to the preceding stage (upstream) of the voltage doubler rectification circuit in this embodiment. If −3,000 V is output as the voltage of the output 2 and a resistor or the like is connected as a dummy load to a point around the output 2, the resistor connected as a dummy load needs to have a withstand voltage of 3,000 V or more, and a resistor high in withstand voltage increases the area and cost. In contrast, when a voltage doubler rectification circuit is included as in this embodiment, the resistor R201 is connected to the input side of the voltage doubler rectification circuit, which means that the resistor R201 only needs to have a half a withstand voltage of 3,000 V (=1,500 V) or less, and a resistor that is relatively small in area and low in cost can therefore be used.

As described above, according to this embodiment, voltages of different polarities can be generated with a single transformer while allowing substantially no drop in versatility.

(Third Embodiment)

Figure 3:
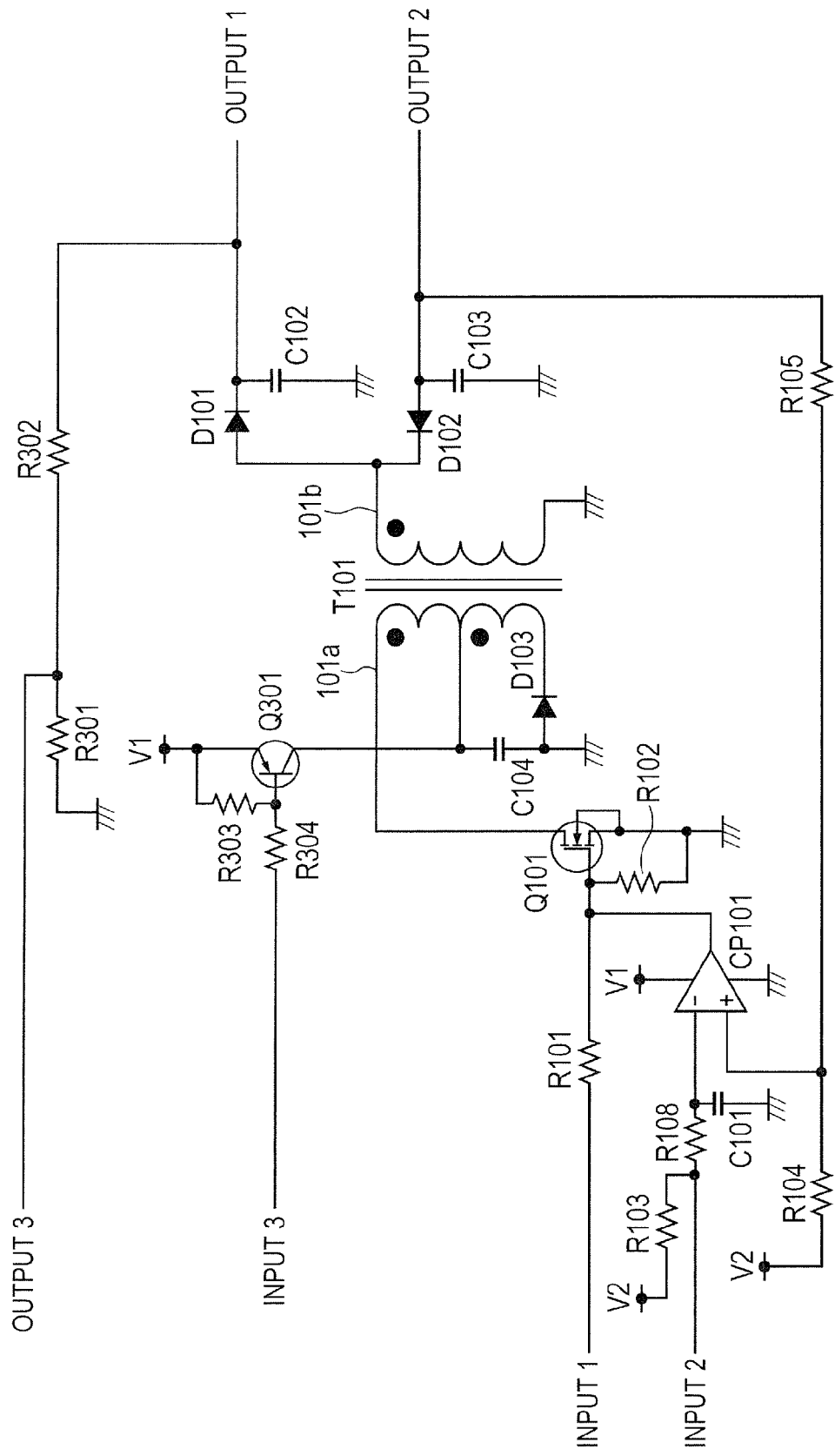
FIG. 3 is a circuit diagram of a power supply apparatus according to a third embodiment of the present invention.

FIG. 3 is a circuit diagram for illustrating the configuration of a power supply apparatus according to a third embodiment of the present invention. Components that are the same as those described with reference to FIG. 1 are denoted by the same reference symbols that are used in FIG. 1, and descriptions thereof are omitted here. In this embodiment, a transistor Q301 is connected between the power supply configured to generate the voltage V1 on the primary side of the transformer T101 and the capacitor C104. To elaborate, the voltage V1 is supplied to an emitter terminal of the transistor Q301, and one end of the capacitor C104 is connected to a collector terminal of the transistor Q301. A signal from an input 3 is connected to a base terminal of the transistor Q301 via a resistor R304. A resistor R303 is connected between the base terminal and emitter terminal of the transistor Q301. One end of a resistor R302 is connected between the cathode terminal of the diode D101 on the secondary side of the transformer T101 and the output 1 in this embodiment. One end of a resistor R301 is connected to the other end of the resistor R302. The other end of the resistor R301 is connected to the GND. A connection point where the resistor R301 and the resistor R302 are connected is connected to an output 3.

The output 1 in the first and second embodiments is controlled by the Zener diode ZD101 so as to have a constant voltage. In contrast, the output 1 in this embodiment has a variable output voltage in this embodiment. As illustrated in FIG. 3, the voltage of the output 1 which is generated by dividing the output voltage of the output 1 by the resistor R301 and the resistor R302 is fed back to a control circuit (not shown) such as a CPU. On the primary side of the transformer T101, the voltage V1 is supplied directly from the power supply in the first and second embodiments, whereas the voltage applied to the transformer T101 is made variable by the transistor Q301 in this embodiment. The transistor Q301 functions as a control unit configured to control the voltage of the output 1, and also functions as a change unit configured to change a voltage applied to the primary winding 101a of the transformer T101. For example, a D/A converter, a drive circuit, or the like that is controlled by the control circuit (not shown) such as a CPU is connected to the input 3, and the voltage between the emitter terminal and collector terminal of the transistor Q301 is controlled so that the output 1 has a predetermined voltage, based on the voltage of the output 1 which is generated by dividing the voltage of the output 1.

When the output voltage of the output 1 is higher than a predetermined value, for example, the voltage obtained from the output 3 is high as well. In this case, the control circuit to which the output 1 is input pulls in less current from the input 3 to increase an electric potential difference between the collector terminal and emitter terminal of the transistor Q301. The voltage supplied to the transformer T101 is lowered in this manner. When the voltage supplied to the transformer T101 is lowered, the excitation current of the transformer T101 is decreased and the voltage of the output 1 which is generated from the forward voltage of the transformer T101 drops.

When the output voltage of the output 1 is lower than the predetermined value, on the other hand, the voltage obtained from the output 1 is low as well. In this case, the control circuit to which the output 1 is input pulls in more current from the input 3 to decrease an electric potential difference between the collector terminal and emitter terminal of the transistor Q301. The voltage supplied to the transformer T101 is raised in this manner. When the voltage supplied to the transformer T101 is raised, the excitation current of the transformer T101 is increased and the voltage of the output 1 which is generated from the forward voltage of the transformer T101 rises. The output 1 is thus controlled so as to have a constant voltage by repeating these operation steps.

In this case, a change in voltage supplied to the transformer T101 changes the flyback voltage of the transformer T101, and accordingly affects the output voltage of the output 2 when the switching element Q101 is driven by a constant frequency. However, the output voltage of the output 2 is automatically controlled so as to have a target voltage specified by the comparator CP101 through the input 2 as described above. The output voltage of the output 2 can thus be kept a predetermined voltage. In this manner, the output 1 and the output 2 of different polarities can be controlled separately from each other with a single transformer so as to have a predetermined voltage. The predetermined voltage is a value determined by the control circuit or the like. The configuration of the output 1 of this embodiment may be applied to the configuration of the output 1 of the second embodiment.

As described above, according to this embodiment, voltages of different polarities can be generated with a single transformer while allowing substantially no drop in versatility.

(Other Embodiment)

While configurations using an electromagnetic transformer that includes a primary winding and secondary windings are described in the first to third embodiments, the present invention may use, for example, a piezoelectric transformer in place of an electromagnetic transformer.

Figure 5:
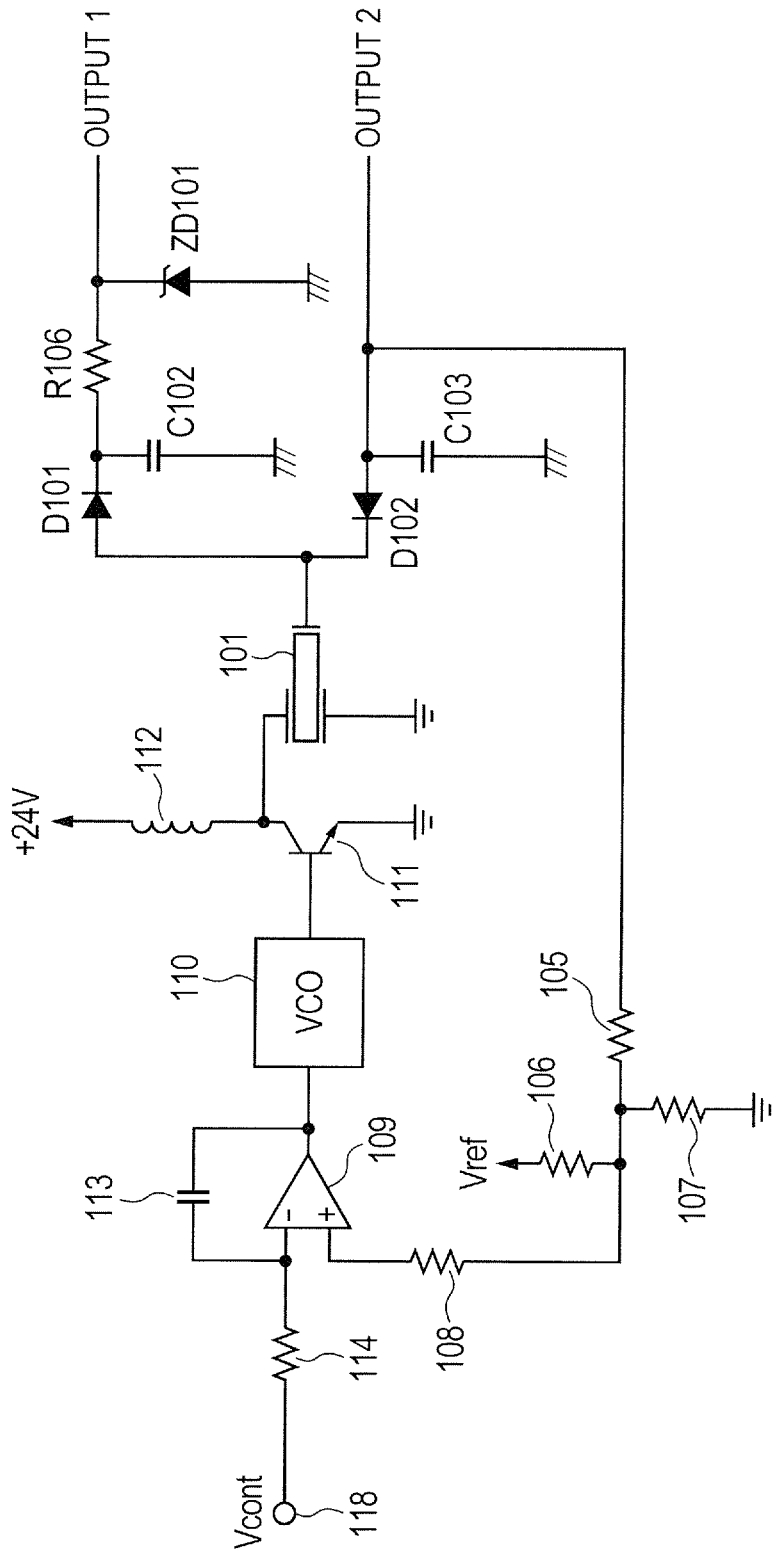
FIG. 5 is a circuit diagram of a power supply apparatus according to another embodiment of the present invention to which a piezoelectric transformer is applied.

A configuration that uses a piezoelectric transformer is illustrated in FIG. 5. A piezoelectric transformer (piezoelectric ceramic transformer) 101 has the same circuit configuration for alternating current output as in the first embodiment to output a positive polarity voltage and a negative polarity voltage (output 1 and output 2). The output voltage of a negative polarity (the output 2) is divided by resistors 105, 106, and 107, and the divided voltage is input to a non-inverting input terminal (+ terminal) of an operation amplifier 109 via a protective resistor 108. A control signal of a high voltage power supply (Vcont) as an analog signal is input from a DC controller to a connection terminal 118 to an inverting input terminal (− terminal) of the operation amplifier via a resistor 114.

The operation amplifier 109, the resistor 114, and a capacitor 113 are connected as illustrated in FIG. 5 to form an integration circuit. The control signal Vcont smoothed out by an integration time constant that is determined by the constant numbers of the resistor 114 and the capacitor 113 is thus input to the operation amplifier 109. An output terminal of the operation amplifier 109 is connected to a voltage control oscillator (VCO) 110, and a power supply voltage (+24 V) is supplied to the primary side of the piezoelectric transformer by driving a transistor 111 having an output terminal connected to an inductor 112.

The configuration of this embodiment which uses a piezoelectric transformer may employ the circuit configuration described in the second embodiment (FIG. 2), or the circuit configuration described in the third embodiment (FIG. 3), for alternating current output.

As described above, according to this embodiment, the same effects as in the configurations of the first to third embodiments can be obtained also with a configuration that uses a piezoelectric transformer.

(Fourth Embodiment)

The power supply apparatus described in the first to third embodiments can be applied as, for example, a power supply of an image forming apparatus. The configuration of an image forming apparatus to which the power supply apparatus of the first to third embodiments are applied is described below.

[Structure of the Image Forming Apparatus]

Figure 4:
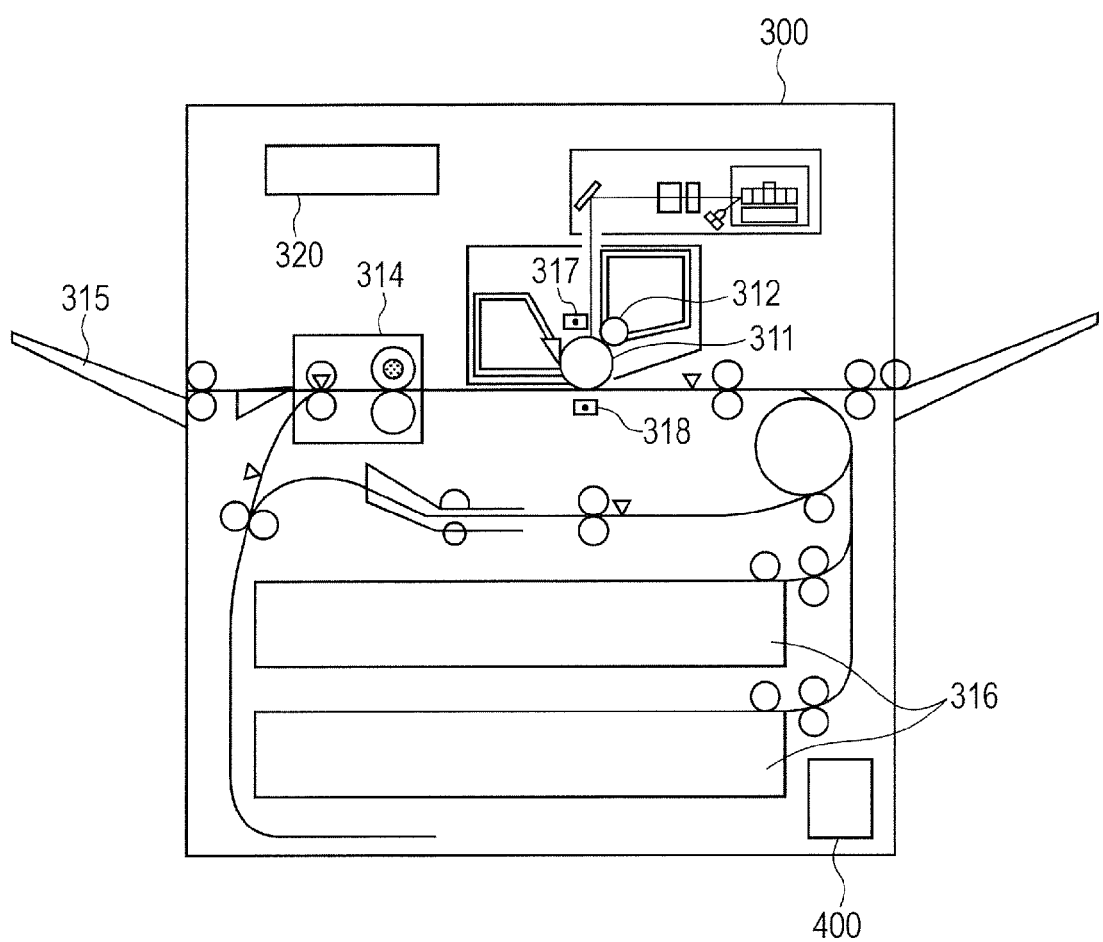
FIG. 4 is a diagram for illustrating an image forming apparatus according to a fourth embodiment of the present invention.

As an example of the image forming apparatus, a laser beam printer is exemplified for description. FIG. 4 is a diagram for illustrating a schematic structure of the laser beam printer as an example of an electrophotographic printer. A laser beam printer 300 includes a photosensitive drum 311 serving as an image bearing member on which an electrostatic latent image is to be formed, a charging unit 317 (charging device) configured to uniformly charge the photosensitive drum 311, and a developing unit 312 (developing device) configured to develop the electrostatic latent image formed on the photosensitive drum 311 with toner. A toner image developed on the photosensitive drum 311 is transferred onto a sheet (not shown) serving as a recording material fed from a cassette 316 by a transfer unit 318 (transfer device). The toner image transferred onto the sheet is fixed by a fixing device 314, and the sheet is discharged to a tray 315. The photosensitive drum 311, the charging unit 317, the developing unit 312, and the transfer unit 318 serve as an image forming unit. The laser beam printer 300 further includes a power supply apparatus 400 described above in the first to third embodiments. The image forming apparatus to which the power supply apparatus 400 of the first to third embodiments can be applied is not limited to that exemplified in FIG. 4. For instance, the image forming apparatus may include a plurality of image forming units. As another example, the image forming apparatus may include a primary transfer unit configured to transfer the toner image on the photosensitive drum 311 onto an intermediate transfer belt, and a secondary transfer unit configured to transfer the toner image on the intermediate transfer belt onto the sheet.

The laser beam printer 300 includes a controller 320 configured to control image forming operation, which is executed by the image forming unit, and sheet conveying operation. When the power supply apparatus included in the laser beam printer 300 is the one in the first or second embodiment, the controller 320 outputs a pulse signal for the switching operation of the switching element Q101 to the input 1 of the power supply apparatus 400. The controller 320 also outputs a PWM signal to the input 2 of the power supply apparatus 400 to control a voltage output from the output 2 so that the output 2 has a predetermined output voltage. The power supply apparatus 400 outputs a positive voltage from the output 1 to a member of the laser beam printer 300 that needs a positive voltage. The power supply apparatus 400 also outputs a negative voltage from the output 2 to a member of the laser beam printer 300 that needs a negative voltage. For example, the power supply apparatus 400 outputs from the output 2 a negative voltage necessary in cleaning to the transfer unit 318, and outputs the charging voltage to the charging unit 317.

When the power supply apparatus included in the laser beam printer 300 is the one in the third embodiment, the controller 320 outputs a signal to the input 3 of the power supply apparatus 400, based on a signal that is input from the output 1 of the power supply apparatus 400, in order to perform control for setting a voltage output from the output 1 to a predetermined voltage.

As described above, according to this embodiment, voltages of different polarities can be generated with a single transformer while allowing substantially no drop in versatility.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-029697, filed Feb. 18, 2015, and Japanese Patent Application No. 2015-257069, filed Dec. 28, 2015, which are hereby incorporated by reference herein in their entirety.

What is claimed is:

1. A power supply apparatus, comprising:
a transformer;
a switching element connected to a primary side of the transformer;
a first line connected to a secondary side of the transformer, the first line configured to output a voltage of a first polarity;
a second line connected to the secondary side of the transformer, the second line configured to output a second polarity voltage whose polarity is opposite to the first polarity;
a first diode connected to the first line in series in a predetermined direction;

a first capacitor connected to the first line between a voltage output side of the first diode and a ground;
a second diode connected to the second line in series in a direction opposite to the predetermined direction of the first diode;
a second capacitor connected to the second line between a voltage output side of the second diode and the ground;
a resistor element connected between the transformer and the second diode in the second line; and
a control unit configured to control a drive frequency of the switching element to control a voltage output from the second line constant.

2. A power supply apparatus according to claim 1,
wherein the control unit comprises a comparator configured to compare a value that is determined by the second polarity voltage output from the second line with a reference value, and
wherein the control unit is configured to control the drive frequency of the switching element based on a result of the comparison made by the comparator.

3. A power supply apparatus according to claim 2, further comprising a change unit configured to change the reference voltage.

4. A power supply apparatus according to claim 1, further comprising a rectification circuit, the rectification circuit comprising a second rectification element and being configured to rectify a voltage induced by the secondary winding of the transformer to a double voltage.

5. A power supply apparatus according to claim 1, further comprising a constant voltage element connected to an output side of a first rectification element, which is configured to keep the voltage of the first polarity constant.

6. A power supply apparatus according to claim 1, further comprising a change unit configured to detect the voltage of the first polarity and, based on a result of the detection, change a voltage applied to a primary winding of the transformer.

7. A power supply apparatus according to claim 1,
wherein the transformer comprises a primary winding and a secondary winding, and
wherein the first line and the second line are connected to the secondary winding.

8. A power supply apparatus according to claim 1,
wherein the transformer comprises a piezoelectric transformer, and
wherein the first line and the second line are connected to a secondary side of the piezoelectric transformer.

9. An image forming apparatus, comprising:
an image forming unit configured to form an image; and
a power supply configured to supply a voltage to the image forming unit,
the power supply comprising:
a transformer;
a switching element connected to a primary side of the transformer;
a first line connected to a secondary side of the transformer, the first line configured to output a voltage of a first polarity;
a second line connected to the secondary side of the transformer, the second line configured to output a second polarity voltage whose polarity is opposite to the first polarity;
a first diode connected to the first line in series in a predetermined direction;
a first capacitor connected to the first line between a voltage output side of the first diode and a ground;
a second diode connected to the second line in series in a direction opposite to the predetermined direction of the first diode;
a second capacitor connected to the second line between a voltage output side of the second diode and the ground;
a resistor element connected between the transformer and the second diode in the second line; and
a control unit configured to control a drive frequency of the switching element to control a voltage output from the second line constant.

10. An image forming apparatus according to claim 9,
wherein the image forming unit comprises:
an image bearing member;
a charging unit configured to charge the image bearing member;
a developing unit configured to develop a latent image that is formed on the image bearing member;
a transfer unit configured to transfer an image that is formed on the image bearing member; and
a fixing unit configured to fix an image that is transferred onto a recording material, and
wherein the power supply is configured to supply a voltage to at least one of the charging unit, the developing unit, the transfer unit, or the fixing unit.

11. An image forming apparatus according to claim 9,
wherein the transformer comprises a primary winding and a secondary winding, and
wherein the first line and the second line are connected to the secondary winding.

12. An image forming apparatus according to claim 9,
wherein the transformer comprises a piezoelectric transformer, and
wherein the first line and the second line are connected to a secondary side of the piezoelectric transformer.

* * * * *